United States Patent
Vepy

[19]

[11] Patent Number: 6,051,948
[45] Date of Patent: Apr. 18, 2000

[54] BIDIRECTIONAL POSITIONING ACTUATOR WITH LIMITED POSITIONING RANGE

[75] Inventor: Tamas A. Vepy, Willowdale, Canada

[73] Assignee: Honeywell Inc., Minneapolis, Minn.

[21] Appl. No.: 09/191,646

[22] Filed: Nov. 13, 1998

[51] Int. Cl.⁷ ..................................................... G05G 5/00
[52] U.S. Cl. ...................... 318/626; 318/446; 318/466; 318/468; 307/119; 307/66
[58] Field of Search ..................................... 318/280–300, 318/445–489, 626; 307/64, 66, 112, 119–124

[56] References Cited

U.S. PATENT DOCUMENTS

| | | | |
|---|---|---|---|
| 4,087,728 | 5/1978 | Porter | 318/466 |
| 4,940,903 | 7/1990 | Brown, Jr. | 318/446 |
| 5,028,853 | 7/1991 | Brown, Jr. | 318/280 |
| 5,081,405 | 1/1992 | Nelson | 318/448 |
| 5,278,454 | 1/1994 | Strauss et al. | 307/64 |
| 5,723,918 | 3/1998 | Schilling et al. | 310/37 |

*Primary Examiner*—David Martin
*Attorney, Agent, or Firm*—Edward L. Schwarz

[57] ABSTRACT

A positioning actuator for positioning at least a part of a movable load at selected positions in a range of available positions in response to corresponding provisions of electrical energy of selected polarities between a pair of power terminals connected through limit switches to an electrical motor which switches limit that range. Energy storage is used to force the motor to further separate the contacts in those switches after they have been initially opened.

14 Claims, 1 Drawing Sheet

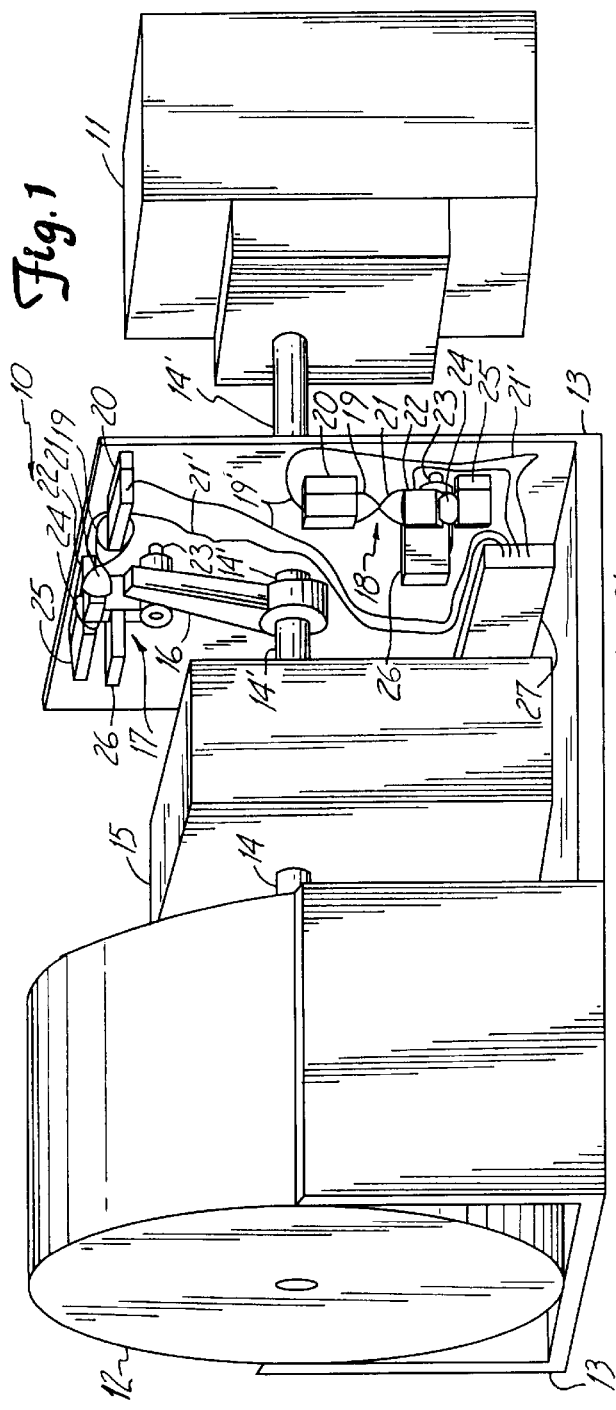
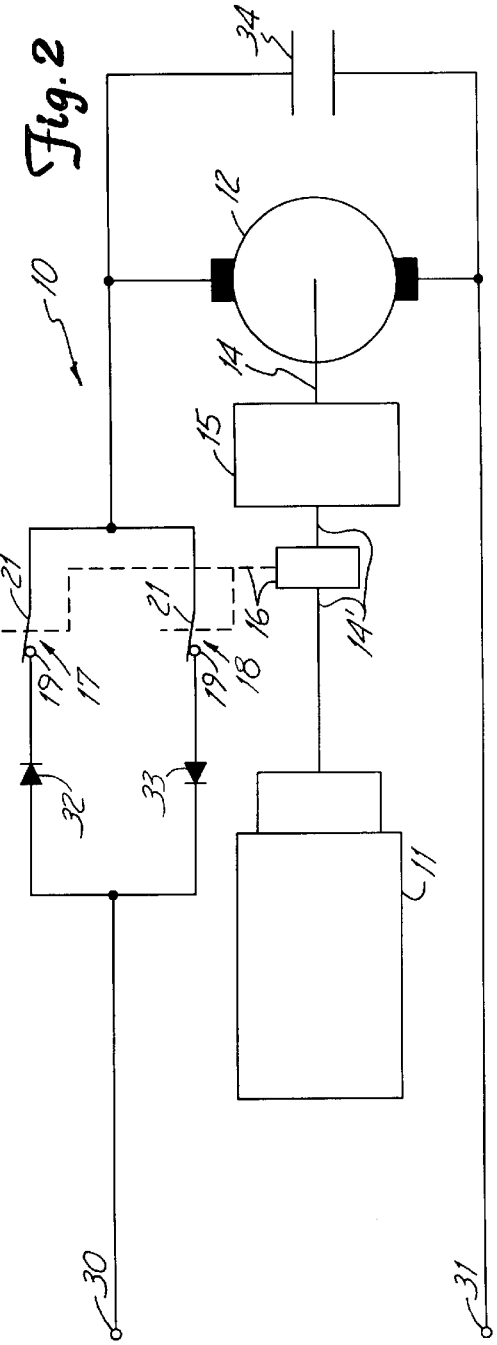

BIDIRECTIONAL POSITIONING ACTUATOR WITH LIMITED POSITIONING RANGE

BACKGROUND OF THE INVENTION

The present invention relates to electromechanical positioning actuators and, more particularly, to electromechanical positioning actuators operating within a limited range of positions available thereto.

Electromechanical positioning actuators are used for forcing mechanical loads, or at least portions thereof, to be moved to selected positions usually over a limited range of available positions. The mechanical load may be substantial thus requiring substantial force to cause movement thereof but, typically, the rate at which such a load is to be moved from position to position in the available range is very slow. Slow actuation is desired, for instance, in operating loads such as valves, dampers, shutters and the like in fluid flow control systems to avoid unduly rapid changes in downstream fluid conditions. Often, such slow actuation is achieved by having the relatively rapidly moving motion generator in the actuator connected to some gear ratio reduction arrangement as part of the mechanical load driven thereby. In some such actuators, the mechanical load is moved primarily linearly while in others the motion is rotational.

In electromechanical positioning actuators, a limit to the range of available mechanical load positions is typically provided by placing a normally closed limit switch at or near the desired range limit to there be forced into an open condition by the load having been moved to that location. Typically, there will be such a limit switch provided to establish each end of that range of available load positions. As part of the mechanical load, a cam or a lever is typically moved with the remainder of the load across the range of load positions to intersect with one or the other of such limit switches when that cam or lever reaches the corresponding end of the positioning range as the basis for forcing open this limit switch at that end. Such an opening results in terminating directly, or through a supplementary switching arrangement operated by the limit switch, the delivering currently of electrical energy to the motion generator which is typically an electric motor.

Electrical motors, of course, provide a rotational output on the output shaft thereof which can be directly used in connection with a connected gear train in an angular positioning actuator, but which must be used with some sort of a linkage or rack and pinion arrangement to convert such rotational motion of the motor output shaft to a linear motion for a linear positioning actuator. In situations where a direct current power supply and polarity controller are available, a direct current motor is a good choice for the motion generator in such actuators because such motors can provide substantial torques, and because of the direction of rotation of the motor armature is easily chosen by merely choosing the direction of operating current through that armature, i.e. by choosing the polarity of the voltage supplied across that armature.

Because of the desire to have a relatively slow movement of the mechanical load across the range of available positions therefor, the gearing arrangement connected to the output shaft of the direct current motor will have a relatively high gear ratio to provide a sufficient reduction of rotational velocity to the remainder of the mechanical load. Such high gear ratios in a gear train, for instance, also have the advantage of making the gear train essentially self-locking against forces directed thereagainst by the remaining load such as fluid forces acting on the actuator fluid control member interfacing with the controlled fluid. As a result of using such high ratios, there will be no or very little motion of the mechanical load once the limit switch opens, including very little additional motion of the cam or lever in the mechanical load used to force open that limit switch. This is because the angular momentum of the motor armature due to its inertia will be quickly damped before many further armature rotations following the termination of supplying electrical energy thereto so that a high gear ratio will mean very little motion of the gear train output shaft.

Many fast, or snap-acting, limit switches have mechanical arrangement therein allowing a position difference between where the cam of lever forces open the contacts in the switch and where the withdrawal of that cam or lever allows the normally closed switch to reclose by permitting those contacts to again come against one another. However, such limit switches are relatively expensive, leading to a desire to use cheaper, slow-acting limit switches which do not have a significant position difference for the forcing cam or lever in opening and closing the contacts of that switch. Such a situation leaves a substantial possibility of the occurrence of arcing between the contacts of such a limit switch when forced just slightly apart, or even the reclosing of that switch after these contacts are initially forced apart just slightly because of residual compliance in that mechanical arrangement.

Such a situation can result in the establishment of a limit cycle in the positioning of the switch contacts such that repeated openings and closings of the limit switch occurs, i.e. a dithering occurs in connection with the switch contacts. Such a behavior causes undue wear on components in the positioning actuator including the motor, the gear train and the limit switch itself, and often provides an accompanying noisy clatter. Thus, there is desired to have an open position for the contacts in a slow-acting limit switch which has a gap between the switch contacts that exceeds the required minimum dielectric gap and any movement thereof toward reclosing due to system compliance after the initial separating of those contacts in an opening of that switch.

BRIEF SUMMARY OF THE INVENTION

The present invention provides a positioning actuator for positioning at least a part of a movable load at selected positions in a range of available positions in response to corresponding provisions of electrical energy of selected polarities between a pair of power terminals. A normally closed limit switch is positioned with respect to the moveable load, or at least some part thereof, so as to be opened by it when it reaches positions in a corresponding portion of the range of available positions. This limit switch is electrically connected through a diode to a corresponding one of the power terminals and one of a pair of armature terminals of a drive motor. The drive motor has an output effector connected to at least the part of the moveable load which can open the limit switch, and sufficient electrical current provided in either direction through the pair of motor terminals will cause the motor output effector to move in a corresponding one of two alternative directions to thereby move the part of at least the part of the moveable load to which it is connected to corresponding positions in said range of available positions. The remaining motor terminal is electrically connected to the remaining power terminal. A capacitor is electrically connected between the pair of motor terminals with a capacitance sufficient to force the drive motor to cause said output effector thereof to move at the part of the moveable load to which it is connected sufficiently to provide a selected assurance gap between internal electrical contacts of the limit switch following an initial separation thereof forced by said moveable load in opening that switch. Furthermore, this same capacitor will also suppress radio frequency emissions generated by the motor commutator.

In one embodiment, the part of the moveable load to which the motor output effector is connected comprises a gearing arrangement such as a gear train having its own output effector which forcibly separates the electrical contacts in the limit switch when reaching positions in the corresponding portion of the range of available positions. A further limit switch can be electrically connected through a diode to the same one of the power terminals and the same one the motor armature terminals as the first limit switch is connected but switch the diode connection reversed in this series arrangement from the direction the first diode is connected in the series arrangement with the first limit switch to thereby provide a range limiter at the other end of the range of positions reached by the moveable load through providing voltages across the power terminals of a polarity opposite that leading to current in the first diode.

BRIEF DESCRIPTION OF THE DRAWINGS

FIG. 1 shows a representation of a mechanical embodiment of the present invention, and FIG. 2 shows a mixed electrical schematic and block diagram representation embodying the present invention.

DETAILED DESCRIPTION

An electromechanical positioning actuator, 10, embodying the present invention is shown in a mechanical diagrammatic representation in FIG. 1. A primary mechanical load, 11, stream, is positioned variously by actuator 10, as desired, which, for example, could be a valve, damper or shutter serving as an interface control element (though not shown) in a fluid stream to interact directly with a fluid.

A direct current motor, 12, serves as a controlled motion generator in actuator 10, and is supported on a base, 13, having both a bottom portion on which motor 12 rests and a turned-up portion supporting other portions of actuator 10. Direct current motor 12 has typical characteristics for a direct current motor including a capability for providing high torque and high efficiency in converting electrical energy to mechanical motion, and a capability for allowing the choice of direction of rotation of the motor armature by choosing the polarity of the electrical energy supplied thereto. The actual value of the torque which can be developed by motor 12 for the electrical energy available thereto is chosen appropriate to needs in positioning the control element in primary mechanical load 11 and of other portions of that mechanical load to be described.

Motor 12 has an output shaft, 14, extending from its armature to be connected to the input shaft of a large gear ratio, speed reducing gear train, 15, represented by a housing block and not shown in detail in FIG. 1. The output of gear train 15 is provided on an output shaft, 14', extending through an opening in the turned-up portion of base 13 to be connected to the primary mechanical load 11 for positioning the control element therein.

In addition, a rotating arm or cam, 16, is affixed to gear train output shaft 14' so that arm 16 rotates with rotations of that shaft. Rotating arm 16 is positioned so as to encounter, during rotation thereof, a portion of either of two limit switches, 17 and 18, by the rotational path of arm 16 intersecting those switch portions as mounted on the upturned portion of base 13. These switches are positioned, in being mounted on this base, so that rotating arm 16 makes direct contact with switch 17 at the point this arm is in an essentially vertical position, and with for switch 18 at the point this arm is in an essentially horizontal position. Anticipating that these limit switches more or less define the range of positions available to rotating arm 16 by terminating motion at the ends thereof, as will be described below, arm 16 has a range of available positions of approximately 90° in the example shown in FIG. 1.

In being mounted on upturned portion of base 13, each of limit switches 17 and 18 in this example is shown having a fixed position electrical contact, 19, mounted on a fixed contact support, 20, in turn mounted on, and electrically isolated from, base 13. In addition, each of limit switches 17 and 18 is shown in this example having a movable electrical contact, 21. Movable contact 21 in each instance is mounted on a movable contact support, 22, which is rotatably coupled to a pin, 23, which is fixedly supported in, and electrically isolated from, the upturned portion of base 13.

On the side of movable contact support 22 opposite fixed electrical contact 19, a resilient forcing means, 24, is mounted on a resilient forcing means support, 25. Resilient forcing means 24 is an elastomeric body which urges movable contact support 22, with contact 21 mounted thereon, toward fixed contact 19 to thereby provide a normally closed switch having contacts 19 and 21 pressed against one another.

Each of movable contact supports 22 has extending outward therefrom an intersection extension, 26, on the side thereof opposite the side of this support facing the upturned portion of base 13. Intersection extension 26 is in the rotational path of rotating arm 16 so that arm 16, when forced thereagainst, results in having movable contact support 22 pressed against resilient forcing body 24 to thereby cause movable electrical contact 21, carried on support 22, to separate from fixed electrical contact 19.

An interconnection, 19', leads from each of fixed electrical contacts 19 in limit switches 17 and 18 to an electrical circuit module, 27. Similarly, an interconnection, 21', leads from each of movable electrical contacts 21 to electrical circuit module 27. Not shown are further interconnections leading from motor 12 to electrical circuit module 27 and the electrical energization and control interconnections leading to that module from the external direct current power supply and polarity controller which operates actuator 10.

FIG. 2 shows a mixed circuit schematic and block diagram representing electromechanical positioning actuator 10 and its mechanical load. The same numerical designations are used in FIG. 2 as are used in FIG. 1 for the same actuator system components appearing in each. As again can be seen, output shaft 14 of motor 12 again rotates gear train 15, and output shaft 14' of gear train 15 again rotates rotating arm 16. Rotating arm 16 is represented in part by dashed lines showing arm 16 controls the positioning of movable contacts 21 in each of limit switches 17 and 18 when in direct contact therewith. Output shaft 14' of gear train 15 is also again shown connected to primary mechanical load 11 to position the control element therein, not shown, in its interacting with the fluid stream as desired.

Each of movable electrical contacts 21 in limit switches 17 and 18 are electrically connected to one terminal of the armature in motor 12. A pair of power terminals, 30 and 31, are provided in electrical circuit module 27 to be connected to the external direct current power supply and polarity controller. This external direct current power supply and polarity controller, not shown, provides voltages across these terminals, but voltages which are selectively applied in time and with selected but varying polarities, though usually of constant polarity in any one such application, to thereby provide the desired control of electromechanical positioning actuator 10.

Terminal 30 has a diode, 32, provided in electrical circuit module 27 of FIG. 1, connected between it and fixed electrical contact 19 of limit switch 17 so that current may flow from terminal 30 to that fixed contact. Terminal 30 also has a further diode, 33, also provided in electrical circuit module 27 of FIG. 1, connected between it and fixed electrical contact 19 of limit switch 18 so that current can flow from that fixed contact to terminal 30. Each of moveable electrical contacts 21 in limit switches 17 and 18 are electrically connected to a terminal of the armature in motor 12. The remaining terminal of the armature in motor 12 is electrically connected to power terminal 31.

Thus, when a constant polarity voltage is applied across power terminals 30 and 31 with the positive voltage polarity on terminal 30, current will be conducted through diode 32 and limit switch 17, and then through the armature of motor 12 to terminal 31. No current will flow through limit switch 18 in this situation because of the blocking action of diode 33. The rotation of gear train output shaft 14' to a position far enough to cause rotating arm 16 to open limit switch 17 will, of course, terminate a previously established current through terminal 30 to terminal 31. Reversing the polarity of the voltage applied across power terminals 30 and 31 leads to a current through the armature of motor 12, and then through limit switch 17 and diode 33 to terminal 30. Current is blocked from passing through limit switch 17 in this situation by the presence of diode 32. Again, the rotation of gear train output shaft 14' in turn causing rotating arm 16 to rotate sufficiently far to open limit switch 18 will terminate a previously established current flow between terminal 31 and terminal 30.

In the actuator system arrangement shown in FIGS. 1 and 2, there is a need to provide additional open space between electrical contacts 19 and 21 in limit switches 17 and 18 by providing further rotations of the armature in motor 12 after either of these limit switches has been initially opened by rotating arm 16. This additional space between contacts is needed not just to provide a dielectric spacing but so that any mechanical compliance in the system that would allow movable contact mounts 22 carrying electrical contacts 21, under the spring-like force applied thereagainst by elastomeric body 24, to move some return distance toward the corresponding one of fixed electrical contacts 19, despite the force of rotating arm 16 against arm intersection extension 26 of that mount 22, is insufficient to permit the occurrence of arcing between, or the rejoining of, those contacts. Rotating arm 26 needs to be forced against intersection extension 26 of the corresponding movable contact mount 22 whenever one of limit switches 17 and 18 has been initially opened to sufficiently further rotate that movable contact mount 22 beyond the position reached thereby just as contacts 21 and 19 separated. This will provide an assurance gap to assure that any such return distance traversed by that mount 22 because of mechanical compliance in the system will not be enough for moveable electrical contact 21 carried on that mount 22 to come so near to the corresponding fixed electrical contact 19 as to allow such arcing or rejoining to occur.

This needed result requires the storage of energy that can be made available to the armature of motor 12 after the opening of either of limit switches 17 or 18 so as to cause that armature to further rotate a sufficient number of times given the gear ratio of gear train 15. A sufficient number of rotations is one which causes rotating arm 16 to rotate sufficiently far against intersection extension 26 on the movable contact mount 22 of that one of those switches currently being opened by arm 16 to press that mount against the corresponding elastomeric body 24 hard enough to provide the desired assurance gap between the movable contact 21 on that mount and the corresponding fixed contact 19. While such energy could be stored mechanically, such as by providing a fly wheel in connection with the armature of motor 12 to increase its effective inertia, a far more convenient arrangement is to store the energy electrically during times current is being conducted through the armature of motor 12, and then applying that stored electrical energy to that armature after the opening of one of limit switches 17 and 18.

Thus, a capacitor, 34, is shown connected across the terminals of the armature of motor 12 in FIG. 2 to provide this electrical energy storage. A typical kind of capacitor for this purpose would be a nonpolar electrolytic capacitor. Capacitor 34 is provided in electrical circuit module 27 of FIG. 1

The capacitance of capacitor 34 must be chosen large enough to cause the number of rotations of the armature in motor 12 thought sufficient to result in enough additional angular rotation of arm 16 to provide the desired gap between movable contact 21 and fixed contact 19 in the one of limit switches 17 and 18 currently being opened by that arm. This capacitance value sufficient for capacitor 34 will depend on the electrical characteristics of the armature circuit of motor 12 including the armature resistance, inductance and the back electromotive force, and on the mechanical loads experienced by armature output shaft 14 of motor 12. This mechanical load will involve the inertia and friction of the armature itself, and the needed torque to rotate arm 16 sufficiently along with the inertia and friction associated with the primary mechanical load as reflected through gear train 15 to output shaft 14 by the gear ratio of that train.

In operation, with power terminal 30 at a positive voltage value with respect to terminal 31 so that a current is provided through diode 32, limit switch 17 and the armature of motor 12 to terminal 31, capacitor 34 will be concurrently charged to the same voltage and polarity appearing between the armature terminals of motor 12. An interruption of the current flow through the armature of motor 12 by the opening of limit switch 17 will result in capacitor 34 discharging the energy stored therein through the armature circuit of motor 12 to thereby provide a current therethrough in the same direction as had previously been supplied therethrough from terminal 30 to terminal 31. As a result, the armature of motor 12 will continue to rotate in the same direction it had previously been rotating prior to the opening of limit switch 17 which will continue until the charge in capacitor 34 is sufficiently dissipated.

Thereafter, the next application of voltage to power terminals 30 and 31 will likely be of the opposite polarity so that terminal 31 is positive with respect to 30 because the direction of rotation of the motor armature will need to be reversed as the mechanical load has already been positioned at its extreme position in the previous direction of rotation in the range of available positions. Such an application of voltage of the opposite polarity will result in a current flowing in the opposition direction through the armature of motor 12, and in the concurrent charging of capacitor 34 to a voltage of this opposite polarity equal to that across the motor armature. Such a voltage provided across the armature of motor 12 will reverse its direction of rotation from the immediately previous direction of rotation. The same result of added rotations of the armature of motor 12 until the energy in capacitor 34 is sufficiently dissipated will be achieved in this second direction of rotation of motor 12 upon arm 16 forcing open limit switch 18 as the mechanical load approaches its extreme position at the opposite end of its available range of positions.

Although the present invention has been described with reference to preferred embodiments, workers skilled in the art will recognize that changes may be made in form and detail without departing from the spirit and scope of the invention.

What is claimed is:

1. A positioning actuator for positioning at least a part of a movable load at selected positions in a range of available positions in response to corresponding provisions of electrical energy of selected polarities between a pair of power terminals, said positioning actuator comprising:

a first range terminator comprising a limit switch, normally closed by having a pair of electrical contacts therein forcibly positioned against one another, electrically connected between first range terminator first and second terminals to allow, when closed, electrical current to be conducted from said first range terminator first terminal to said first range terminator second terminal, said first range terminator limit switch being positioned with respect to at least said part of said moveable load so as to be opened by that part of said moveable load forcibly separating said electrical contacts in said limit switch when reaching positions in a corresponding first portion of said range of available positions, said first range terminator first terminal being electrically connected to a corresponding one of said power terminals;

a drive motor having an output effector connected to at least said part of said moveable load and having a pair of motor terminals through which sufficient electrical current provided in either direction therethrough will cause said output effector to move in a corresponding one of two alternative directions to thereby move at least said part of said moveable load to corresponding positions in said range of available positions, said first range terminator second terminal being electrically connected to one of said pair of motor terminals and with that other of said pair of motor terminals being electrically connected to that said power terminal opposite that one of said pair of power terminals electrically connected to said first range terminator first terminal; and a capacitor electrically connected between said motor terminals of a capacitance sufficient to force said drive motor to cause said output effector thereof to move at least said part of said moveable load sufficiently to provide a selected assurance gap between said first range terminator limit switch electrical contacts following an initial separation thereof forced by said moveable load.

2. The apparatus of claim 1 wherein said assurance gap exceeds a return distance over which said first range terminator limit switch electrical contacts reapproach one another following a separation thereof forced by said moveable load.

3. The apparatus of claim 1 wherein said first range terminator further has a diode electrically connected in series with said first range terminator limit switch between said first range terminator first and second terminal.

4. The apparatus of claim 1 further comprising a second range terminator having a limit switch, normally closed by having a pair of electrical contacts therein forcibly positioned against one another, electrically connected between second range terminator first and second terminals to allow, when closed, electrical current to be conducted from said second range terminator second terminal to said second range terminator first terminal, said second range terminator limit switch being positioned with respect to at least a part of said moveable load so as to be opened by that part of said moveable load forcibly separating said electrical contacts in said limit switch when reaching positions in a corresponding second portion of said range of available positions, said second range terminator first terminal being electrically connected to said first range terminator first terminal and said second range terminator second terminal being electrically connected to said first range terminator second terminal.

5. The apparatus of claim 1 wherein said part of said moveable load comprises a gearing arrangement having an output effector which forcibly separates said electrical contacts in said first range terminator limit switch when reaching positions in said corresponding first portion of said range of available positions.

6. The apparatus of claim 1 wherein said drive motor is a direct current motor.

7. The apparatus of claim 4 wherein said second range terminator further has a diode electrically connected in series with said second range terminator limit switch between said second range terminator first and second terminals.

8. The apparatus of claim 4 wherein said capacitor electrically connected between said motor terminals is of a capacitance sufficient to force said drive motor to cause said output effector thereof to cause said output effector thereof to move at least said part of said moveable load sufficiently to provide a selected assurance gap between said second range terminator limit switch electrical contacts following an initial separation thereof forced by said moveable load.

9. The apparatus of claim 5 wherein said gearing arrangement is a gear train.

10. A positioning actuator for positioning at least a part of a movable load at positions in a selected range of available positions in response to provisions of electrical energy of a selected polarities between first and second power terminals, said positioning actuator comprising:

a direct current motor having first and second armature terminals and an output shaft connected to a gearing arrangement having an output effector;

a first diode and a first normally closed limit switch electrically connected in series with one another between said first power terminal and said first armature terminal and positioned in said range of available positions; such that said gearing arrangement output effector can open said first limit switch; and a capacitor connected between said first and second armature terminals and with said second armature terminal also being electrically connected to said second power terminal, said capacitor being of sufficient capacitance to force said direct current motor to further rotate after said first limit switch has been opened by said gear train output effector so as to force electrical contacts in said first limit switch to separate sufficiently to provide a selected gap therebetween.

11. The apparatus of claim 10 wherein said selected gap exceeds a return distance over which said first limit switch electrical contacts reapproach one another following a separation thereof forced by said gearing arrangement output effector.

12. The apparatus of claim 10 further comprising a second diode and a second normally closed limit switch electrically connected in series with one another between said first power terminal and said first armature terminal and positioned in said range of available positions such that said gearing arrangement output effector can open said second limit switch.

13. The apparatus of claim 10 wherein said gearing arrangement output effector can forcibly separate said electrical contacts in said first limit switch in opening that switch.

14. The apparatus of claim 13 wherein said gearing arrangement is a gear train.

* * * * *